Sept. 5, 1950 H. D. PINKSTAFF 2,521,090
FRUIT PACKER
Filed May 7, 1947
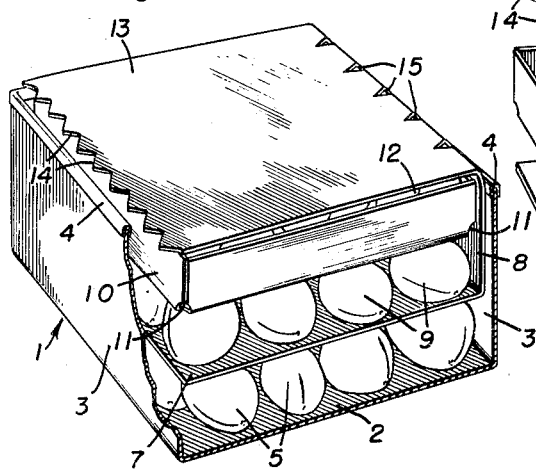
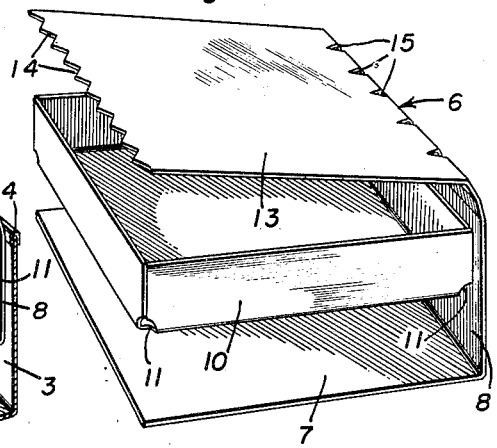
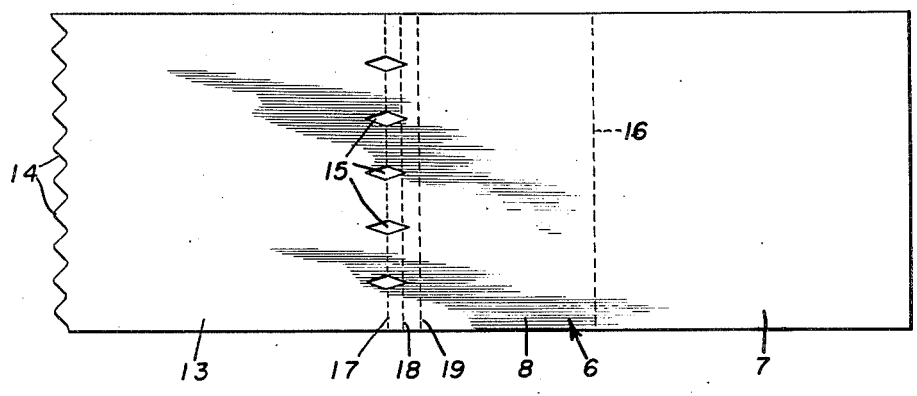
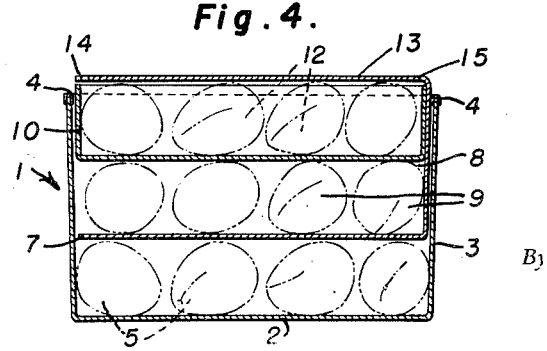
Inventor
Harold D. Pinkstaff
By
Clarence A. O'Brien
and Harvey B. Jacobson
Attorneys Patented Sept. 5, 1950

2,521,090

UNITED STATES PATENT OFFICE 2,521,090

FRUIT PACKER

Harold D. Pinkstaff, Visalia, Calif., assignor of fifty per cent to Clyde Lester, Sanger, Calif., and fifty per cent to Paper Products Company, Visalia, Calif., a copartnership Application May 7, 1947, Serial No. 746,471

1 Claim. (Cl. 229—42)

This invention relates to improvements in fruit packing material.

An object of the invention is to provide an improved fruit packing device for separating and protecting adjacent layers of fruit when packed in a fruit box or basket.

Another object of the invention is to provide a U-shaped foldable fruit-supporting and covering curtain preferably formed of a thick paper or cardboard for positioning in a fruit box or basket upon which a layer of fruit will be packed, after which an open top shim or paper container will be placed on top of the layer of fruit in the bottom of the curtain member and filled with a layer of fruit, and the upper top portion of said curtain will be folded over the top layer of fruit.

A further object of the invention is to provide an improved fruit packing curtain which will be highly efficient in use, and relatively inexpensive to manufacture and produce.

Other objects will appear as the description proceeds.

In the accompanying drawings which form a part of this application,

Figure 1 is a perspective view of a packed fruit basket or container partly broken away to show the improved packing curtain and shim in position therein;

Figure 2 is a perspective view of the improved packing curtain and shim;

Figure 3 is an opened-out, flat view of the improved packing curtain; and

Figure 4 is a vertical sectional view taken through the packed fruit basket or container shown in Figure 1.

Like characters of reference are used throughout the following specification and the accompanying drawings to designate corresponding parts.

In carrying out the invention, there is shown a substantially rectangular fruit container or basket generally designated by the reference numeral 1, having a bottom 2, four side walls 3, and a reinforcing bead 4 of inverted U-shape disposed about the upper edges of said side walls 3.

In packing the container or basket 1, the first or lower layer of fruit 5 is placed in position, after which the improved U-shaped curtain 6 is placed on this layer of fruit with a side 7 disposed on top of the fruit, and the base 8 of the curtain is disposed along the inside of a side wall 3, and a second layer of fruit 9 is packed on the side 7.

Following this, an open-top shim 10 is placed on the layer of fruit 9, said shim having ventilating openings 11 in the lower corners. A third layer of fruit 12 is packed in the shim 10, after which the top 13 of the curtain 6 is bent to overlie the top layer of fruit 12.

The end edge of the top 13 is serrated, as at 14, to provide ventilation, and notches 15 are formed in the opposite edge of the top 13, also for providing additional ventilation.

A score line 16 is formed between the sections 7 and 8, while three score lines 17, 18 and 19 are formed between the sections 8 and 13, to provide for the ready folding of the curtain 6.

Fruit packed in this manner as hereinbefore described will ship better, since air can reach all parts of the container or basket.

From the foregoing description, it will be seen that there has been devised and provided a highly efficient form of fruit packing device.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

In combination with a substantially rectangular fruit container having a bottom wall and side walls, a U-shaped curtain having a bottom and upper leg portions and a web portion, the bottom leg portion being adapted to rest upon fruit on the bottom wall of said container, the web portion of said curtain being adapted to lie adjacent the inside of one of said side walls, and an open shim adapted to be supported upon fruit on the bottom leg portion of said curtain, the corners of said shim being provided with ventilation apertures, the upper leg portion of said curtain overlying the top of said shim and extending slightly above the top of the container, the upper leg portion being provided with ventilation apertures.

HAROLD D. PINKSTAFF.

REFERENCES CITED

The following references are of record in the file of this patent:

UNITED STATES PATENTS

| Number | Name | Date |
|---|---|---|
| 1,077,403 | Fricke | Nov. 4, 1913 |
| 1,608,422 | Plass | Nov. 23, 1926 |
| 1,664,308 | Miller | Mar. 27, 1928 |
| 1,882,524 | Sherman | Oct. 11, 1932 |
| 2,006,780 | Trew | July 2, 1935 |
| 2,178,434 | Rice | Oct. 31, 1939 |
| 2,257,977 | Richard | Oct. 7, 1941 |